Aug. 8, 1944.  R. DAUB  2,355,277
INTERNAL-COMBUSTION ENGINE
Filed Dec. 27, 1941  8 Sheets-Sheet 3

INVENTOR
RUDOLPH DAUB
BY
ATTORNEY

Aug. 8, 1944.  R. DAUB  2,355,277
INTERNAL-COMBUSTION ENGINE
Filed Dec. 27, 1941   8 Sheets-Sheet 4

INVENTOR
RUDOLPH DAUB
BY
ATTORNEY

Aug. 8, 1944. R. DAUB 2,355,277
INTERNAL-COMBUSTION ENGINE
Filed Dec. 27, 1941 8 Sheets-Sheet 5

INVENTOR
RUDOLPH DAUB
BY
ATTORNEY

Aug. 8, 1944.  R. DAUB  2,355,277
INTERNAL-COMBUSTION ENGINE
Filed Dec. 27, 1941   8 Sheets-Sheet 6

INVENTOR
RUDOLPH DAUB
BY
ATTORNEY

Aug. 8, 1944.                R. DAUB                    2,355,277
                     INTERNAL-COMBUSTION ENGINE
                        Filed Dec. 27, 1941           8 Sheets-Sheet 7

INVENTOR
RUDOLPH DAUB
BY
ATTORNEY

Aug. 8, 1944.  R. DAUB  2,355,277
INTERNAL-COMBUSTION ENGINE
Filed Dec. 27, 1941  8 Sheets-Sheet 8

INVENTOR
RUDOLPH DAUB
BY
ATTORNEY

Patented Aug. 8, 1944

2,355,277

UNITED STATES PATENT OFFICE 2,355,277

INTERNAL-COMBUSTION ENGINE

Rudolph Daub, Paterson, N. J., assignor to Wright Aeronautical Corporation, a corporation of New York Application December 27, 1941, Serial No. 424,560

9 Claims. (Cl. 123—173)

This invention relates to internal combustion engines and in particular comprises a continuing development of the engine design principles disclosed in the application of W. B. Goodman, Serial No. 424,563, filed December 27, 1941.

In general, an object of the invention is to provide an internal combustion engine assembly in which a very large number of engine cylinders are used in order to secure high power in a single engine unit. A further object of the invention is to provide an aircraft engine of high power in which the components of the engine are so designed and arranged as to secure maximum power output with minimum bulk and weight, an associated object being to provide an engine in which the design is as simple, and the components as accessible, as is possible to secure in a power plant of the class here dealt with. A further object is to provide an improved liquid cooling system for a multicylinder engine. A further object is to provide an improved lubrication system for a multicylinder engine. A further object is to provide an improved valve operating mechanism for a multicylinder engine. A further object is to provide an improved power take-off and reduction gear system for a multicylinder aircraft engine. A further object is to provide an improved supercharger drive gear for an engine. A further object is to provide an improved accessory drive gearing system for an engine.

The above objects and further objects will become clear in reading the annexed detailed description of the invention in connection with the drawings, in which:

Figs. 1, 2, and 3 are longitudinal sections through the engine, representing respectively the front, middle, and rear portions of the engine;

Figures 11, 12:
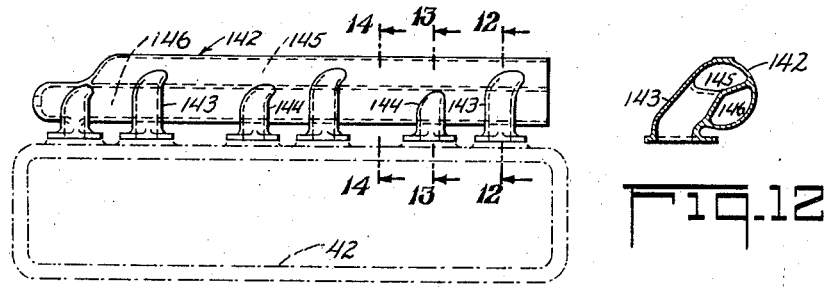
Fig. 11 is a plan of one of the intake manifolds shown in connection with one of the cylinder rows.
Figures 13, 14:
Figure 15:
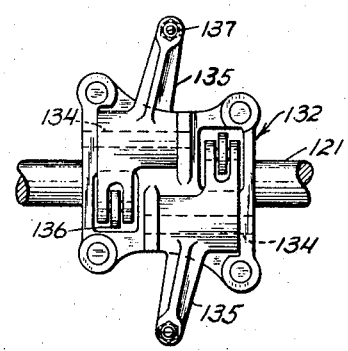

Figs. 12, 13, and 14 are sections respectively on the lines 12—12, 13—13 and 14—14 of Fig. 11; and Fig. 15 is a plan of one of the several rocker arm and camshaft bearing brackets of the engine valve gear.

Figs. 1 to 7 of the drawings in this case are identical with the drawings in the Goodman application above referred to. The basic engine structure consists briefly of a plurality of tandem arranged polygonal crankcase units the flat faces of these crankcase sections being alined in a fore-and-aft direction. En bloc cylinder rows are secured to the crankcase faces or decks formed by the built-up crankcase sections whereby the engine may be considered as a multibank radial cylinder engine, or as an in-line engine having a plurality of radially arranged rows. Each bank of cylinders includes the usual pistons and connecting rods, one of the connecting rods engaging a crankpin of a crankshaft associated with that bank. There are a plurality of crankshafts extending in tandem through the engine and each of these crankshafts is geared to a plurality of high speed layshafts, disposed around the crankshafts and between the skirts of the radially arranged cylinders. The front ends of the layshafts are geared to a central power shaft, coaxial with the crankshaft. Each cylinder row includes an overhead camshaft driven from gears at the front end of the engine which gears also serve to drive certain engine auxiliaries. Other engine auxiliaries are disposed at the rear end of the engine and are driven from the several high speed layshafts and from one of the crankshafts.

Referring first to Figs. 1, 2, 3, and 5, I show a plurality of crankcase units 16 and 17 in alternate tandem relation. Secured to the front end of the forwardmost crankcase section 16 is a front crankcase section 18, and secured to the rear end of the rearwardmost crankcase section 16 is a rear crankcase section 19. These crankcase sections are bolted to one another by bolts 20 engaging inturned flanges 21 formed on respective crankcase sections at the diametral planes of the several banks of cylinders. Each crankcase section 16 includes a bearing diaphragm 23 having a main bearing bushing 24 for the center journal 25 of a two-throw crankshaft unit 26. The front journal of said crankshaft unit, as at 27, is borne in a main bearing bushing 28 secured within a bearing diaphragm 29 integral with each crankcase section 17. The rear journal 31 of each crankshaft unit 26 is piloted in a counterbore in the front journal 27 of the next rearward crankshaft in such a manner that adjacent tandem crankshafts may oscillate freely with respect to each other. The rear crankcheek 33 of each crankshaft 26 carries a drive gear 34 which is securely bolted to the cheek, said drive gear lying between the rear face of its crankcheek and the adjacent bearing diaphragm 29. The crankshafts per se are of built-up construction, the center journal 25 and adjacent crankpins 36 and 37 comprising an integral unit, the rear crankcheek 33 being clamp-bolted to the rear crankpin 37 and the front crankcheek 38 being clamp-bolted to the front crankpin 36, said rear and front crankcheeks respectively being integral with the rear and front journals 31 and 27.

As indicated above, the several crankcase sections 16 to 19 are of polygonal exterior form and when assembled comprise exteriorly an elongated polygonal cylinder wherein the polygon sides comprise cylinder decks, one of these decks being numbered 40. To each deck, an en bloc cylinder row is secured which bridges the built-up crankcase sections, and in the embodiment shown, each cylinder row includes six cylinders 41 preferably of cast material to provide integral coolant jackets 42. Each cylinder carries a liner 43 and in each cylinder is engaged a piston 44 equipped with a piston rod. One piston of a bank is pinned to a master connecting rod 45 having a solid or continuous big end bearing, engaging its associated crankpin 36 or 37. Articulated connecting rods 46 connect the remaining pistons of each cylinder bank with the master connecting rod, as is conventional practice in radial cylinder engines. It will be noted that the cylinders of any one longitudinal row are arranged substantially in pairs—for instance, the central two cylinders shown are closer to one another than to the cylinder pairs ahead of them or behind them. This spacing of cylinder pairs is to allow for a through passage 48 between them which passage extends from the top of the cylinder block to the cylinder deck 40 drilled at 49 on each side of the bearing diaphragm 29 to allow free communication from the crankcase interior to a camshaft and valve cavity, extended along the top of each row of cylinders, said cavity being established by a cylinder cover 50 secured to suitable flanges 47 integral with the cylinder jacket castings.

Figure 1:
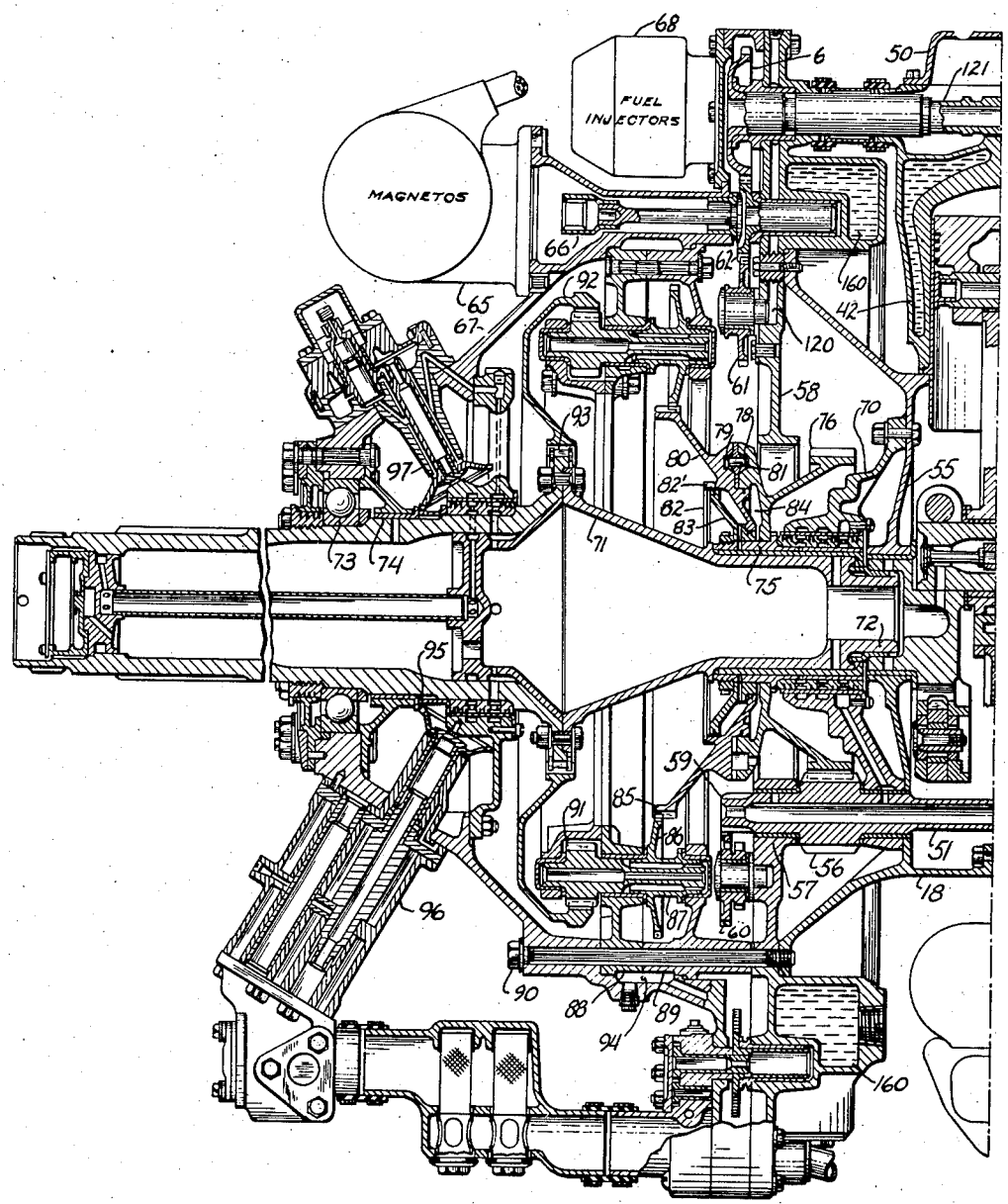
Figure 2:
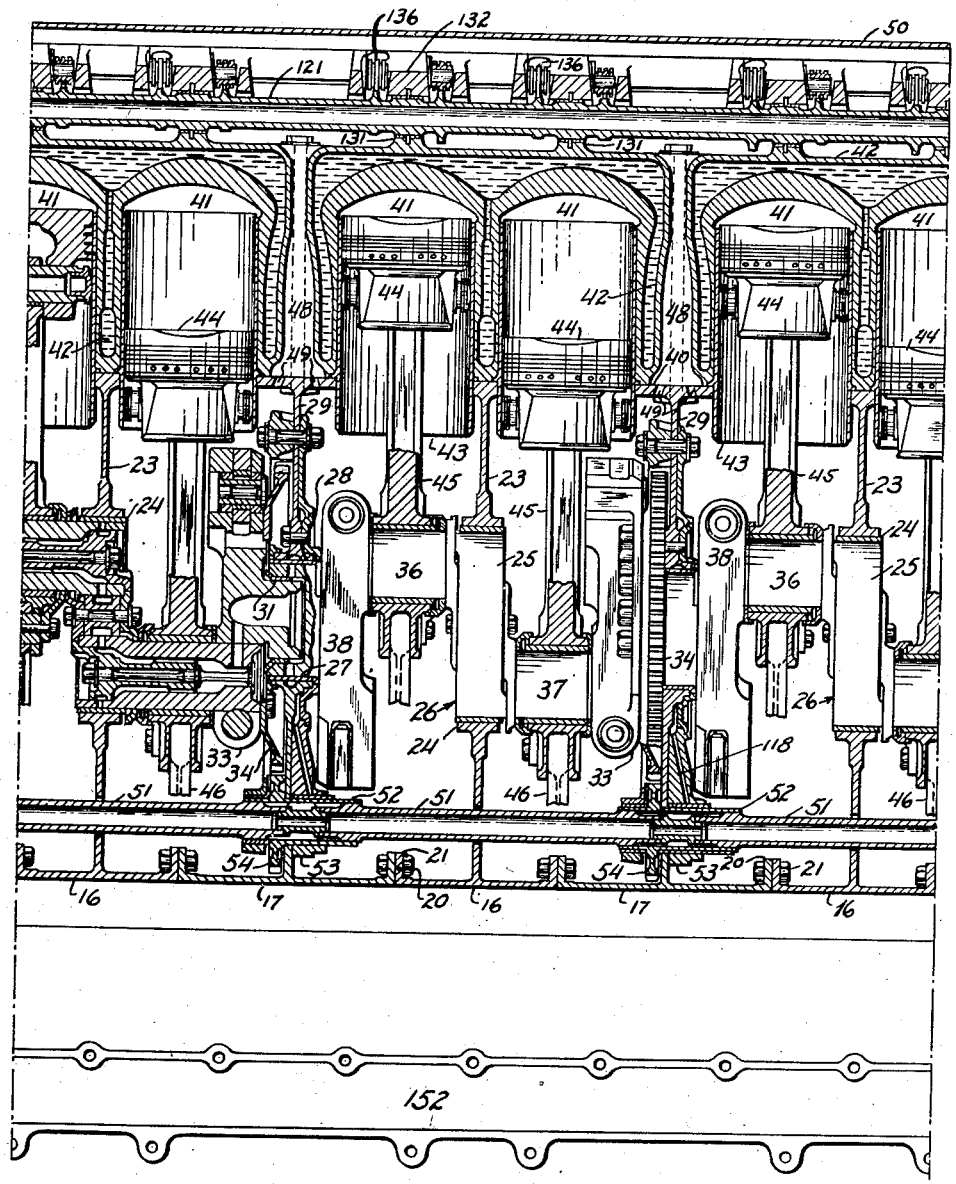

Between the sleeves 43 of the cylinders are disposed layshafts 51, parallel to the crankshaft axis. These layshafts as shown in Fig. 2, comprise tandem sections whose ends are splined to sleeves 52 which are borne in bearings 53 secured to the diaphragms 29. Integral with each sleeve 52 is a pinion 54 which engages one of the crankshaft gears 34. The front end of the front layshaft 51 is carried in a bearing in the diaphragm 55 at the front of the crankcase section 18 and carries an integral drive pinion 56 borne in an outboard bearing 57 in an auxiliary diaphragm 58 secured to the crankcase. A small pinion 59 is formed at the extreme front end of the front layshaft 51, this pinion driving a compound idler gear 60, in turn driving an idler gear 61, and idler gear 62, and a camshaft gear 63, all of which are journalled in the diaphragm 58. There is one gear train 59, 60, 61, 62, and 63 for each layshaft 51 and for each row of cylinders. As shown in Fig. 1, one of the idler gears such as 62 may be used to drive an engine auxiliary such as a magneto 65, to serve the adjacent cylinder row, through a shaft 66 secured to the crankcase nose section 67. If the engine is of the fuel injection type, a fuel injector unit 68, to serve the adjacent cylinder row, may be driven from each camshaft gear 63. The magneto and fuel injector of each cylinder row serves that cylinder row and may be timed perfectly in accord with piston positions of that row. This arrangement avoids the timing inaccuracies common to usual radial engines having master and articulated connecting rods wherein the magnetos are driven from the crankshaft and serves all cylinders of a radial bank. In this engine, one magneto serves all master rod cylinders, and another magneto serves each alined row of articulated rod cylinders.

As shown, the engine may be considered as a six bank radial engine having seven cylinders per bank, or alternately, as an in-line engine having seven radial rows of six cylinders each. The number of cylinders in each bank or in each row may be changed as desired. For instance, each row might have four cylinders, and the center crankshaft unit would be eliminated, giving a 28 cylinder engine.

To the front crankcase diaphragm 55, a bearing member 70 is secured which forms an oil transfer bearing cooperating with the rear end of a propeller shaft 71 at the extreme rear end of which is a journal 72 piloted in the bearing in the front end of the front crankshaft. Said propeller shaft 71 is further carried in a thrust bearing 73 and a radial bearing 74 at the front end of the crankcase nose section 67. Piloted on a bushing 75 associated with the oil transfer bearing in the member 70 is an intermediate gear 76 meshed with the several layshaft pinions 56. Said gear includes inclined annularly arranged pockets 78 opposite similar annularly arranged inclined pockets 79 in an axially shiftable member 80, there being a plurality of rollers 81 between said pockets to transfer torsional driving effort from the gear 76 to the member 80 while at the same time creating an axial force between said members which is proportional to the torque transmitted. A cylinder 82 is formed in the member 80 which is engaged by a piston 83 rigid with the bushing 75 and with the gear 76. Fluid under pressure is admitted to the cavity between the piston and cylinder through the oil transfer bearing in the member 70 to counteract the axial thrust caused by transmitted torque. Pressure of the hydraulic fluid in the cylinder 82 will thus be proportional to torque transmitted and this pressure is registered on an appropriate gauge. As pressure builds up in the cylinder 82, it will be moved axially relative to the piston, until the latter uncovers a bleed port 82' in the cylinder rim to establish a pressure proportional to the torque transmitted. A centrifugal balance cell 84 is formed between the member 80 and a portion of the hub of the gear 76, to which oil bleeds from the cylinder 82. This cell is vented close to its most radially inward point, so that, during rotation of the system the centrifugally produced oil pressures in the cell 84 and in the cylinder 82 are balanced and thus do not affect torque-proportional pressure in the cylinder 82. The member 80 carries a gear 85 meshed with a plurality of gears 86 on layshafts 87 journalled in bearing members 88 and 89 secured to the crankcase nose section 67 by bolts 90. Said layshafts carry pinions 91 meshed with a ring gear 92 secured at a spline connection 93, to the propeller shaft 71. It will be noted that said shaft comprises rearward and forward portions which are secured to one another in the region of the spline connection 93. The members 88 and 89 define, with the crankcase nose section, an annular oil duct 94 serving as a distributor, as will become apparent.

When changes in reduction gear ratio, or a dual propeller shaft or a two speed propeller drive are desired, these matters may be taken care of by altering the gears and elements 86, 87, 88, 89, 91, and 92, as a bench assembly, separate from the engine per se, and installed as a unit in the nose section. Furthermore, the torque meter remains intact with the engine and, since it is disposed between the engine and reduction gear, always indicates true engine torque regardless of the reduction gear ratio.

Immediately rearward of the plane radial bearing 74 is a bevel gear 95, secured to the propeller shaft, which gear serves to drive an oil pump unit 96 and a propeller governor unit 97, both of said units being secured to the crankcase nose section 67.

Figure 3:
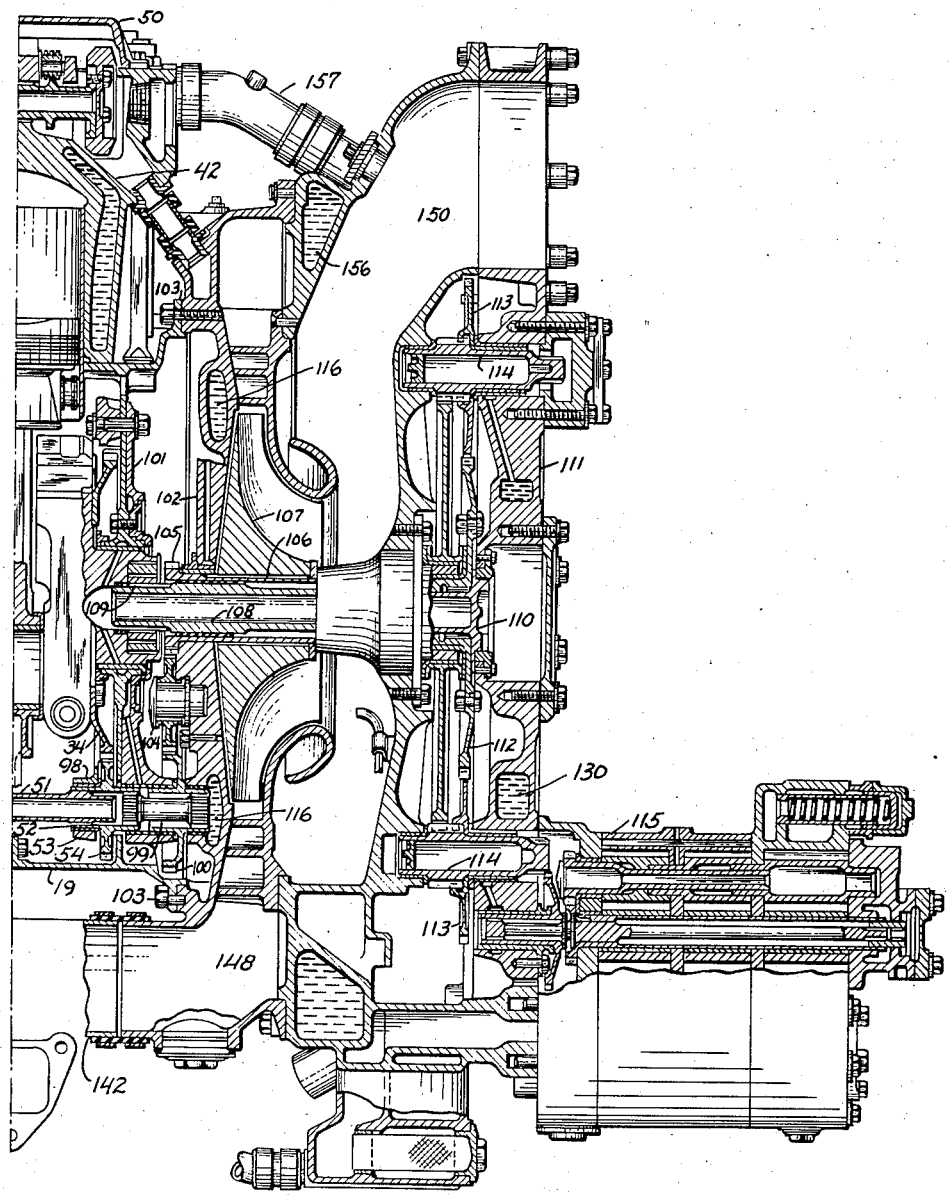
Figure 4:
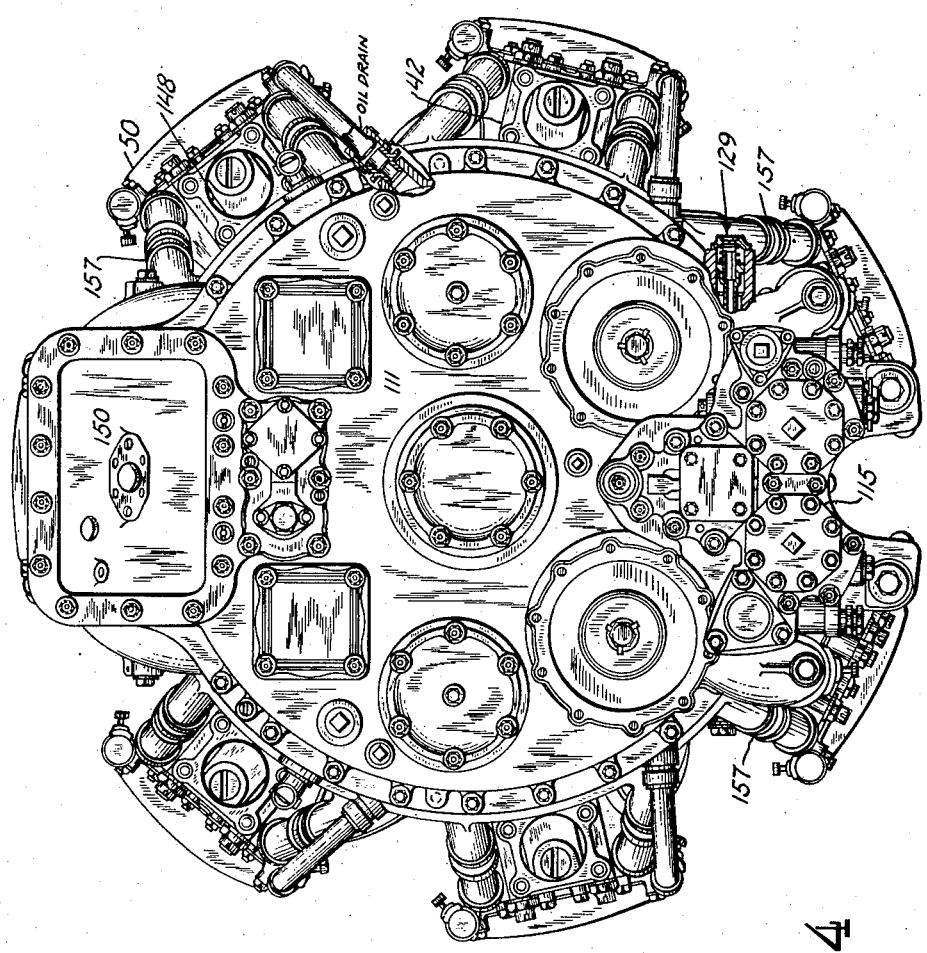
Fig. 4 is a rear elevation of the engine.

Referring now to Fig. 3, the rear crankcase section 19 carries a bearing member 98 in which the rearmost layshaft pinion 54 is journalled. The pinion 54, as before described, has a spline connection with the rear layshaft 51. The sleeves of one or more of the rear pinions 54 are splined to a short shaft 99 splined to a gear 100 borne in bearings in a rear crankcase bearing member 101 and in a front supercharger housing member 102, the latter being secured as at 103 to the rear crankcase 19. Idler gears 104 are carried by the housing 102, which are driven by the gears 100 and which drive the supercharger impeller shaft gear 105, the impeller shaft with which said gear is integral being designated 106 and having splined thereto a supercharger impeller 107. The shaft 106 is piloted upon a rear crankshaft extension 108 whose front end is splined to the rear cheek of the rear crankshaft at 109. The rear end of the shaft 108 is splined to a starter drive dog 110 secured in a crankcase accessory section 111. Said shaft 108 carries a gear 112 on its rear end meshed with a plurality of gears 113 on layshafts 114 which comprise power take-offs for various engine auxiliaries such as generators, tachometer drives, and oil pumps, an oil pump unit being shown at 115.

It will be noted that the rear crankshaft extension 108 is at the same end of the rear crankshaft as its power gear 34, insuring smooth torque to the accessory drives, uninfluenced by torsional wind-up in the crankshaft. In the usual engine, power is taken from one end of the crankshaft while accessories are driven from the other, unbalancing the phase relation therebetween due to variations in angular deflection between the crankshaft ends caused by torque variations.

In this engine, direction of rotation may be reversed merely by changing the camshafts, the supercharger impeller and diffuser, and altering the drive gearing in the accessory section to allow accessories to rotate in the same direction as before the change was made. The accessory section change would consist in adding an idler gear between the gears 112 and 113.

The rear oil pump unit includes a pressure pump and a scavenging pump, the former delivering pressure oil through a suitable conduit in the crankcase sections, not shown, to a pressure oil annulus 116 integral with the front supercharger housing 102, said annulus passing across the rear ends of the several layshafts 51. These layshafts are all hollow, as shown, and pressure oil passes from the annulus 116 forwardly along the layshafts which are provided at appropriate intervals with openings communicating with holes in bearing bushings which in turn communicate with oil passages such as 118 leading to the main crankshaft bearings of the engine. Said main crankshaft bearings in turn are drilled to conduct oil to the crankshaft interiors whence oil is conducted to the crankpin bearings for lubrication of the connecting rod bearings, knuckle pin bearings and pistons in the usual manner. Referring briefly to Fig. 1, it will be noted that the front layshafts 51 are provided with drillings to lubricate certain of the reduction gear bearings and, through suitable holes in the crankcase members, pressure oil is led from the layshaft headers to the distributing annulus 94 and to sundry bearings of the reduction gear and nose section.

Figure 7:
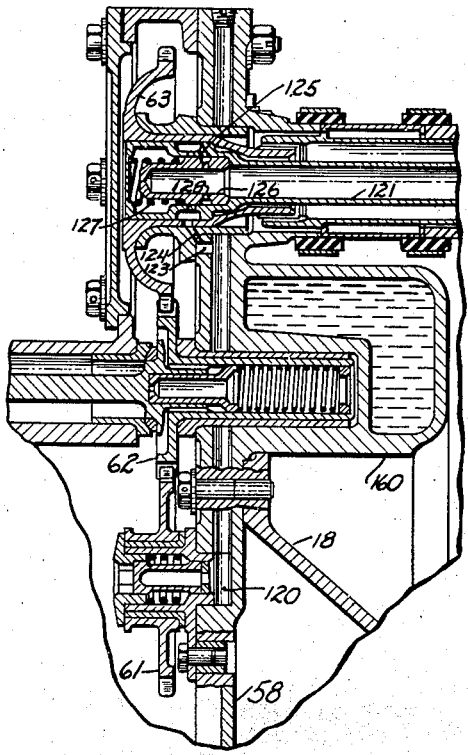
Fig. 7 is an enlarged longitudinal section through a portion of Fig. 1.

Fig. 7 shows one of several similar oil passages 120, fed from the layshaft, passing across the journals for the several camshaft idler gears 61 and 62 for one cylinder row, for lubrication thereof, to the bearing for the camshaft gear 63. This bearing with associated parts comprises an automatic pressure reducer to admit oil to the hollow camshaft 121 at a pressure less than full pump pressure. To this end, drillings 123, 124, and 125 are formed in the several bushings and hub elements of the camshaft gear, the drilling 125 being in the camshaft 121 and forming a port which cooperates with an axially slidable valve 126 normally urged to the right by a spring 127. Said sleeve includes radial drillings 128 which may at times register with drillings 125 to allow of oil entrance into the hollow camshaft. When the oil pressure within the camshaft increases, the valve 126 will move to the left under the influence of said pressure, against the spring 127, to throttle the drilling 125 and to maintain within the camshaft an oil pressure established by the strength of the spring 127. The purpose of this reduction in oil pressure to the camshaft is to control oil flow and to avoid excessive oil bleed from the pressure system, since the lubrication requirements for the valve gear are small. There is a similar system for each camshaft and for each cylinder row.

Figure 8:
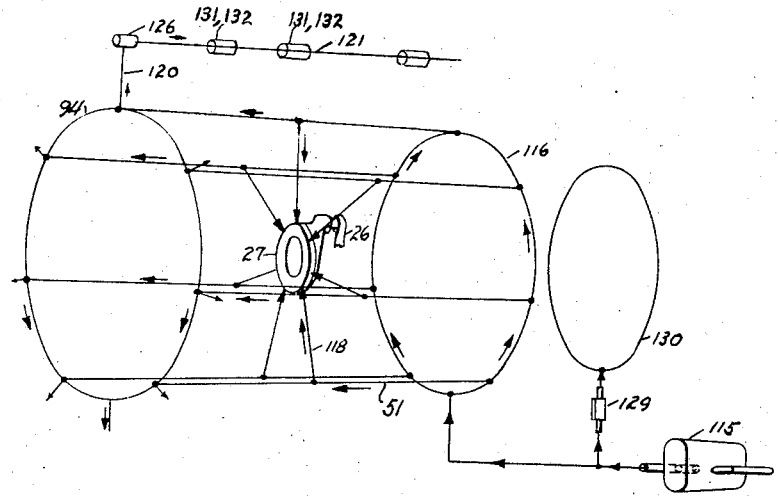
Fig. 8 is a diagrammatic perspective view of the engine lubrication system.

In a diagrammatic representation of the lubrication system in Fig. 8, this oil pressure reducer is designated 126. Another pressure reducing valve 129, shown in Fig. 8, is arranged between the oil pump 115 and a low pressure oil feed annulus 130 in the accessory drive section 111 (Fig. 3), this annulus serving as an oil header for the lubrication of the several accessory drive gears.

Figure 5:
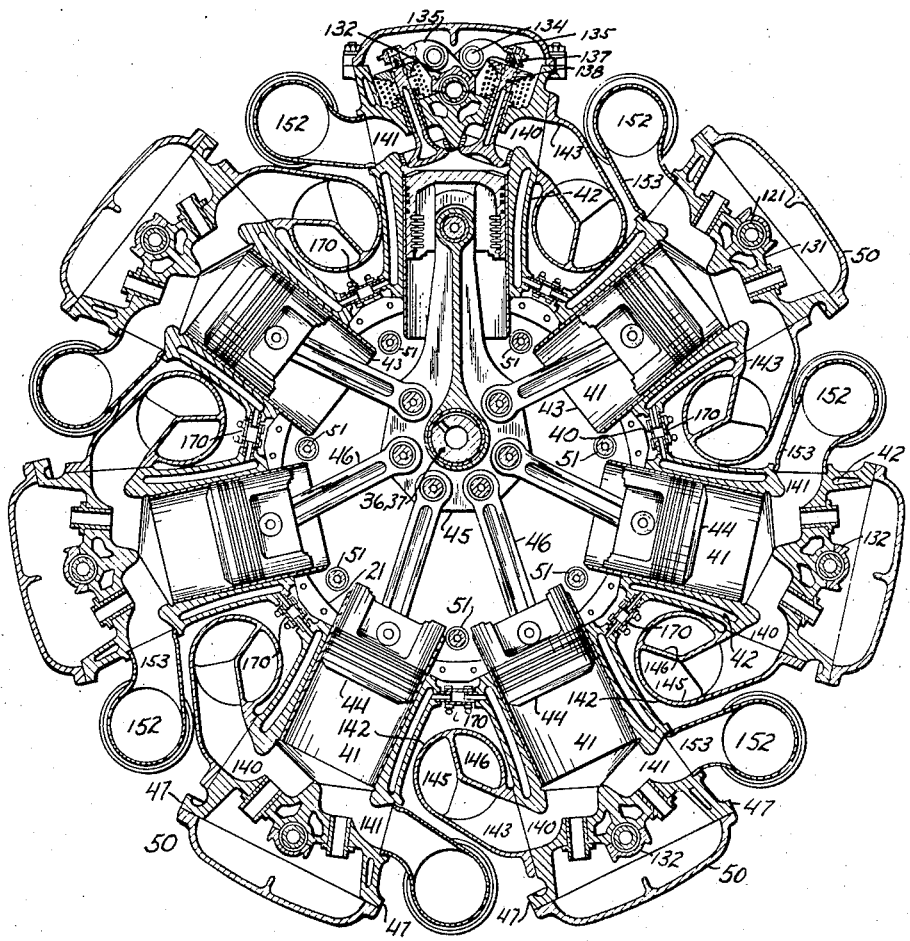
Fig. 5 is a section through the engine on the central plane through one of the several banks of cylinders.
Figure 6:
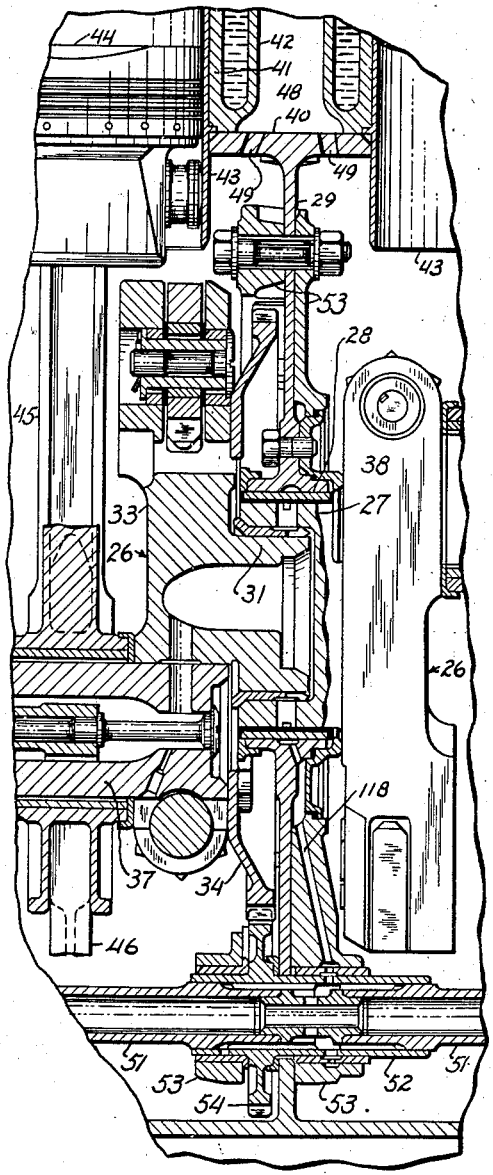
Fig. 6 is an enlarged longitudinal section through a portion of Fig. 2.

Referring to Figs. 2, 5, and 15 it will be seen that each camshaft 121 extends the full length of each cylinder row and is journalled in a lower bearing half 131 formed in the head of each cylinder and carrying a suitable half bushing. The bearing cap 132 which secures the camshaft to the bearing half 131 is bolted to the cylinder head and comprises a unitary fitting which includes two sets of rocker bearings 134 axially parallel to the camshaft and spaced above and to either side of the camshaft. These bearings carry rocker arms 135 having rollers 136 engaged with the camshaft and having adjustable elements 137 for engagement with the tops of valve stems 138. This unitary bearing cap and rocker carrier 132 avoids the use of many small parts and affords easy assembly and disassembly of the rocker system and of the camshaft assembly. There is one cap and rocker assembly 132 for each cylinder head and it will be noted that bending deflections in the camshaft are minimized by having a camshaft bearing between each pair of cams and rocker arms. The valves 138 are carried in valve guides in the cylinder head in the conventional manner, as shown in Fig. 5, and their heads engage inserted valve seats at the top of each combustion chamber.

As shown in Fig. 5, the clockwise side of each cylinder row is provided with intake ports 140, while the counterclockwise side of each cylinder row is provided with exhaust ports 141. An intake manifold 142 (Figs. 5 and 11 to 14) is disposed in the V between each row of cylinders, this manifold being disposed radially inwardly of the ports 140 and being connected to said ports by conduits 143 and 144. The manifold 142 is formed with parallel separate internal passages 145 and 146. The conduits 143, which are connected to alternate cylinders of the row, communicate with the passage 145 while the short conduits 144, registering with the other alternate cylinders, communicate with the passage 146. The rear end of each manifold 142, as shown in Fig. 3, communicates with a diffuser chamber 148 into which air is delivered by the supercharger impeller 107 which receives the air through an intake duct 150. A carburetor, not shown, is connected at a face 151 if the engine is to use a carburetor instead of fuel injection. The problem of uniform air or mixture distribution to an engine having a large number of cylinders, as in the present design, is a difficult one and the double passage manifolds just described comprise a means of assuring uniform distribution, by dividing the flow into a large plurality of different passages which, in the embodiment shown, provide in effect a separate manifold for each three cylinders of the engine. The three cylinders as fed by each manifold are spaced apart by a considerable interval in the firing order of the engine so that overlap in flow to more than one cylinder of each manifold, at any one time, is avoided. An exhaust manifold 152 is disposed between each row of cylinders and is connected to the exhaust ports 141 by conduits 153.

Figure 9:
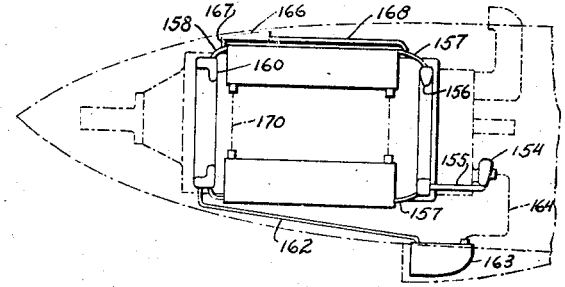
Fig. 9 is a side elevation of an engine, diagrammatic in character, as installed in the nose of an aircraft, and showing details of the cooling system in particular.
Figure 10:
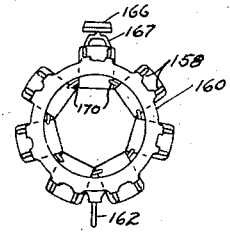
Fig. 10 is a front view of the engine showing in particular, components of the cooling system.

The liquid cooling system of the engine is quite novel in character and is indicated diagrammatically in Fig. 9 as well as being shown in the basic section of the engine in Figs. 1 and 3. Coolant liquid is placed under pressure by a pump 154 which is connected by a conduit 155 to an annular coolant manifold 156 cored in the rear supercharger section of the engine casing. From this manifold, coolant flows through conduits 157 leading to the upper part of the rear cooling jacket of each cylinder row whence coolant flows longitudinally from rear to front through the jackets to conduits 158 connecting the upper front end of each coolant jacket with a front coolant annular manifold 160 cored in the casting which also forms the idler gear support diaphragm 158. Coolant from the manifold 160 is returned through a pipe 162 to a radiator 163 from which liquid passes to the pump intake through a pipe 164 (Fig. 9).

To allow for coolant expansion and for complete filling of the whole coolant system, a header tank 166 is disposed above the engine, this header tank being connected by pipes 167 and 168 to the uppermost portions of the manifolds 156 and 160. Since coolant is fed to and removed from the jackets of the several cylinder rows at the uppermost portions thereof, that is, at those portions which are farthest removed radially from the crankshaft axis, intercommunication between the bottoms of the several jackets is necessary to avoid air locks in the system. To this end, Figs. 5 and 9 show connecting conduits 170 between the jackets of adjacent cylinder rows, these conduits being disposed in the planes of the most forward and of the most rearward bank of cylinders. The lowermost connectors 170 along with the coolant manifolds as shown in Fig. 5, allow air, gas or steam to flow upwardly through successive cylinder jackets to the uppermost jacket whence these bubbles will discharge into the manifolds 156 or 160, passing from these to the header tank 166 for escape. Thus, complete liquid filling of the entire jacket system is assured at all times and in any position of the engine.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a multi-bank, multi-row liquid cooled engine wherein a plurality of rows of en bloc cylinders are disposed radially about a crankcase, the cylinder blocks having coolant liquid passages therethrough, an annular manifold at each end of the engine, a conduit from the outer portion of one end of each block to one said manifold, a conduit from the outer portion of the other end of each block to the other manifold, a coolant entrance to one manifold, and a coolant exit from the other manifold.

2. In a multi-bank, multi-row liquid cooled engine wherein a plurality of rows of en bloc cylinders are disposed radially about a crankcase, the cylinder blocks having coolant liquid passages therethrough, an annular manifold at each end of the engine, a conduit from the outer portion of one end of each block to one said manifold, a conduit from the outer portion of the other end of each block to the other manifold, a coolant entrance to one manifold, a coolant exit from the other manifold, and a fluid conduit between each end of each block, close to the cylinder bases and to corresponding points on the adjacent blocks.

3. In an engine, a substantially polygonal crankcase defining cylinder decks on the sides thereof, rows of cylinders extending lengthwise of the crankcase, each said row being secured to one of said decks, coolant jackets embracing the cylinders and extending lengthwise of the cylinders from a point close to the crankcase to a point adjacent the cylinder heads, a fluid inlet at one end of each row, a fluid outlet at the other end of each row, a fluid inlet manifold connected to the several inlets, and a fluid outlet manifold connected to the several outlets.

4. In an engine, a substantially polygonal crankcase defining cylinder decks on the sides thereof, rows of cylinders extending lengthwise of the crankcase, each said row being secured to one of said decks, coolant jackets embracing the cylinders and extending lengthwise of the cylinders from a point close to the crankcase to a point adjacent the cylinder heads, a fluid inlet at one end of each row, a fluid outlet at the other end of each row, a fluid inlet manifold connected to the several inlets, a fluid outlet manifold connected to the several outlets, and fluid connections between the several jackets of the cylinder rows to establish communication therebetween whereby all jackets may be maintained full of fluid.

5. In an engine, a substantially polygonal crankcase defining cylinder decks on the sides thereof, said crankcase comprising a plurality of tandem arranged sections in end-to-end relation and each section having a bearing diaphragm, crankshaft means supported by said diaphragms, a plurality of en bloc cylinder rows each secured to a deck of the crankcase and bridging the several sections thereof, pistons in the cylinders, and connecting rods operably connecting the pistons with said crankshaft means.

6. In an engine, a substantially polygonal crankcase defining cylinder decks on the sides thereof, said crankcase comprising a plurality of tandem arranged sections in end-to-end relation and each section having a bearing diaphragm, crankshaft means supported by said diaphragms, a plurality of en bloc cylinder rows each secured to a deck of the crankcase and bridging the several sections thereof, pistons in the cylinders, connecting rods operably connecting the pistons with said crankshaft means, said cylinder blocks having coolant jackets extending from end to end and lengthwise of the cylinders, a coolant manifold embracing each end of the engine, each connected to the block jackets, and equalizing connections between adjacent jackets near the cylinder bases.

7. In an engine, a substantially polygonal crankcase defining cylinder decks on the sides thereof, said crankcase comprising a plurality of annular tandem arranged sections in end-to-end relation, each section having a bearing diaphragm for supporting crankshaft means, and a plurality of en bloc coolant jackets each secured to a deck of the crankcase and bridging the several sections thereof, each coolant jacket containing a row of cylinders, pistons in the cylinders, and connecting rods operatively connecting the pistons with said crankshaft means.

8. In a cooling system for an engine comprising a plurality of radially disposed in-line cylinder rows, a liquid coolant jacket embracing the cylinders of each row, an annular inlet manifold connected to the outer portion of one end of each jacket, and an annular outlet manifold connected to the outer portion of the other end of each jacket.

9. In a cooling system for an engine comprising a plurality of radially disposed in-line cylinder rows, a liquid coolant jacket embracing the cylinders of each row, an annular inlet manifold connected to the outer portion of one end of each jacket, an annular outlet manifold connected to the outer portion of the other end of each jacket, and a liquid passageway between the inner ends of adjacent jackets.

RUDOLPH DAUB.